(12) United States Patent
Chiam et al.

(10) Patent No.: US 8,019,388 B2
(45) Date of Patent: Sep. 13, 2011

(54) MAIN MENU NAVIGATION PRINCIPLE FOR MOBILE PHONE USER

(75) Inventors: Thor Itt Chiam, Singapore (SG); Bassam Jabry, Singapore (SG)

(73) Assignee: Flextronics AP, LLC, Broomfield, CO (US)

( * ) Notice: Subject to any disclaimer, the term of this patent is extended or adjusted under 35 U.S.C. 154(b) by 378 days.

(21) Appl. No.: 10/772,887

(22) Filed: Feb. 4, 2004

(65) Prior Publication Data

US 2005/0009571 A1    Jan. 13, 2005

Related U.S. Application Data

(60) Provisional application No. 60/445,939, filed on Feb. 6, 2003.

(51) Int. Cl.
  *H04W 4/00* (2009.01)
(52) U.S. Cl. ......... 455/566; 455/416; 715/850; 715/841
(58) Field of Classification Search ............... 455/466, 455/566, 416; 466/566; 345/169; 715/850, 715/841
See application file for complete search history.

(56) References Cited

U.S. PATENT DOCUMENTS

| | | | |
|---|---|---|---|
| 5,856,827 A | 1/1999 | Sudo | |
| 6,463,304 B2* | 10/2002 | Smethers | 455/566 |
| 6,608,637 B1* | 8/2003 | Beaton et al. | 715/762 |
| 6,944,482 B2 | 9/2005 | Engstrom et al. | |
| 7,092,495 B2 | 8/2006 | Kraft et al. | |
| 7,188,320 B1* | 3/2007 | Landers | 715/850 |
| 7,693,556 B2 | 4/2010 | Park et al. | |
| 2001/0003097 A1* | 6/2001 | Jeoung | 455/566 |
| 2001/0046886 A1* | 11/2001 | Ishigaki | 455/566 |
| 2002/0072395 A1* | 6/2002 | Miramontes | 455/566 |
| 2002/0077156 A1 | 6/2002 | Smethers | |
| 2003/0064757 A1* | 4/2003 | Yamadera et al. | 455/566 |

OTHER PUBLICATIONS

Office Action (translation) issued for Taiwanese application No. 093102688 mailed Jun. 29, 2010, pp. 1-6.
Office Action (translation) issued for Taiwanese application No. 093102688 mailed Dec. 15, 2010, 10 pages.
Foreign office action dated May 11, 2011, Application No. 093102688, Entitled: Main Menu Navigation Principle for Mobile Phone User, 9 pages.

* cited by examiner

*Primary Examiner* — Pierre-Louis Desir
(74) *Attorney, Agent, or Firm* — Haverstock & Owens LLP

(57) ABSTRACT

A menu-driven electronic device utilizes a display and a single two-dimensional navigation key. The display is configured to selectively display one of a plurality of menus, including a main menu and a sub-menu. The two-dimensional navigation key is configured to select one of a plurality of main menu items and to select a sub-menu item of the sub-menu associated with a selected main menu item. A portion of the plurality of menu main items is displayed. The main menu and the sub-menu can be accessed by maintaining contact with the two-dimensional navigation key. The device is configured to display a main menu item icon to provide a visual reference to the selected main menu item in a menu tree of the menu being displayed. The device is preferably a cellular phone.

35 Claims, 4 Drawing Sheets

MAIN MENU NAVIGATION PRINCIPLE FOR MOBILE PHONE USER

RELATED APPLICATIONS

This application claims priority under 35 U.S.C. §119(e) of the co-pending U.S. provisional application Ser. No. 60/445,939 filed on Feb. 6, 2003 and entitled "INTEGRATED CELLULAR PHONE, DIGITAL CAMERA, AND PDA, WITH SWIVEL MECHANISM PROVIDING ACCESS TO THE INTERFACE ELEMENTS OF EACH FUNCTION AND MAIN MENU NAVIGATION PRINCIPLE FOR MOBILE PHONE USER." The provisional application Ser. No. 60/445,939 filed on Feb. 6, 2003 and entitled "INTEGRATED CELLULAR PHONE, DIGITAL CAMERA, AND PDA, WITH SWIVEL MECHANISM PROVIDING ACCESS TO THE INTERFACE ELEMENTS OF EACH FUNCTION AND MAIN MENU NAVIGATION PRINCIPLE FOR MOBILE PHONE USER" is also hereby incorporated by reference.

FIELD OF THE INVENTION

The present invention relates to the field of navigating menus in an electronic device. More particularly, the present invention relates to menu-driven cellular phones.

BACKGROUND OF THE INVENTION

Cellular phones have proven to be a convenient tool for the mobile society of today. Unfortunately, conventional cellular phones often require time-consuming multiple keystrokes to select and access an item of a menu in a menu tree. Furthermore, conventional cellular phones do not give an adequate visual reference to an item of a menu in a menu tree. Also, conventional cellular phones often fail to provide ample information as to which menus, menu items, sub-menus and sub-menu items are accessible.

Current menu-driven cellular phones navigate with either a two-dimensional navigation key in combination with a separate enter/select key, a three-dimensional navigation key, or a combination thereof. This document uses a "two-dimensional navigation key" to mean a four-way key having four sets of contacts, such as found on electronic games for navigating up, down, left and right in the usual manner. This document uses "three-dimensional navigation key" to mean a navigation key similar to a two-way key also having a fifth set of contacts which are activated by pressing on the navigation key in approximately the center. Conventional cellular phones require users to depress a navigation key and one or more other keys to access an item of a menu. Oftentimes, one must hit the navigation key and then hit at least one soft key or one key of the numeric keypad of the phone to access a menu item. This requirement for multiple keystrokes from multiple keys to access a menu item causes conventional cellular phones to be inefficient, inconvenient, and frustrating. Using the two-dimensional navigation key with a separate enter/select key is cumbersome and can be frustrating by requiring the user to focus more attention on moving their thumb or finger from the navigation key to the select/enter key and back. The three-dimensional navigation key solves this problem, but costs substantially more than a conventional two-dimension navigation key and is also more expensive than the combination of a conventional two-dimensional navigation key plus separate enter/select keys.

What is needed is a user-friendly menu-driven cellular phone which allows quick navigation through menus, menu items, sub-menus, and sub-menu items with fewer keystrokes. Specifically, to address the problems noted above, what is needed is a menu-driven cellular phone that allows a user to navigate through graphically-enhanced menus while maintaining contact with a single two-dimensional navigation key.

SUMMARY OF THE INVENTION

The present invention provides improved use of a cellular phone, by allowing immediate access to items and menus in a menu tree by allowing the user to maintain contact with a two-dimensional navigation key. In essence, this invention eliminates the requirement of keystrokes from multiple keys to access a menu item. According to the present invention, access to menus and menu items of the menu tree of the cellular phone is possible through the use of the two-dimensional navigation key. Thus, one can navigate throughout the menus of the menu tree by maintaining tactile contact with the single two-dimensional navigation key of the device. An expensive three-dimensional navigation key is not required.

Furthermore, the present invention provides a solution to the confusing maze of multiple menus in conventional cellular phones. The present invention is directed to a wireless telecommunications device with a user interface that provides a visual reference to an item in the menu tree. The device further provides information as to which menus, menu items, sub-menus and sub-menu items are accessible. Thus, the cellular phone of the present invention gives a visual reference to a menu item in the menu tree, thereby eliminating any confusion regarding the item and the menu being displayed on a display of the cellular phone.

In accordance with the preferred embodiment of the present invention, a menu-driven electronic device comprises a display and a two-dimensional navigation key. The display is configured to selectively display one of a plurality of menus. The plurality of menus include a main menu and at least one sub-menu. The main menu further comprises a plurality of main menu items. The two-dimensional navigation key is configured to select one of a plurality of unique orientations. A first orientation of the two-dimensional navigation key is configured to select one of the plurality of main menu items. A second orientation of the two-dimensional navigation key is configured to select a sub-menu item of the sub-menu associated with a selected main menu item. At least a portion of the plurality of main menu items is displayed. Both the selected main menu item and then the sub-menu can be accessed by maintaining contact with the two-dimensional navigation key. By way of example, the first orientation could be accessed by toggling the single two-dimensional navigation key upwards and downwards, and the second orientation could be accessed by toggling the two-dimensional navigation key leftwards and rightwards. It will be appreciated that any of a myriad of orientations is possible.

By way of example, consider a cellular phone that has a main menu and at least one level of sub-menus. In this example, the user toggles among main menu items by selecting left or right on the two-dimensional navigation key. The currently selected main menu item is highlighted in some manner as discussed in more detail below. By pressing to the down direction, that main menu item is selected and the screen will change appropriately. If the selection was incorrect, the user can press to the left direction to revert back to the previous level. If the selected main menu item has more than one sub-menu item, the user can select among those sub-menu items by pressing up or down and sequentially highlighting sub-menu items. Upon highlighting the desired submenu item, it can be selected by pressing to the right and de-selected by pressing to the left. This process can continue if the selected sub-menu item has sub-sub-menus. It will be apparent that the choice of left versus right, up, down or even diagonals is merely optional.

Furthermore, according to the preferred embodiment, the device is configured to display a selected main menu item simultaneously with the sub-menu associated with the selected main menu item. Also, the device is configured to display the selected main menu item simultaneously with a sub-menu item of the sub-menu associated with the selected main menu item. According to the preferred embodiment of the present invention, the plurality of menus are organized in a so-called menu tree. The main menu comprises a plurality of icons each representing a main menu item. The device is configured to display one of the plurality of icons to provide a visual reference to an item in the menu tree of the menu being displayed. In accordance with the preferred embodiment, when the device displays the main menu, a main menu item is represented by a main menu icon, and when the device displays a sub-menu, the main menu item is represented by a miniaturized main menu icon.

A further embodiment of the present invention includes a menu-driven wireless telecommunications device. In the preferred embodiment of the present invention, the device is a phone. However, the present invention can be used to navigate among main menus and sub-menus of any electronic device, such as a handheld PDA, personal computer, video game, or portable gaming device. The main menu comprises a plurality of main menu items. At least one of the plurality of main menu items is associated with a non-graphical listing of a sub-menu. The sub-menu comprises a plurality of sub-menu items. A first orientation of the two-dimensional navigation key is configured to select a main menu item. A second orientation of the two-dimensional navigation key is configured to select a sub-menu item of the sub-menu associated with the selected main menu item. A third orientation of the two-dimensional navigation key is configured to select a further sub-sub-menu item. In the preferred embodiment, the third orientation is the same as the first orientation. Upon selecting the main menu item of the main menu, the sub-menu is displayed on the display. Both the main menu and the sub-menu can be accessed by maintaining contact with the two-dimensional navigation key. This particular embodiment is referred to as the Mini Icon Solution.

In another embodiment of the present invention, the electronic device is a menu-driven wireless telecommunications device. The grid menu serves as a main menu, which further comprises a plurality of main menu items represented by a plurality of main menu icons. The two-dimensional navigation key is used uniquely for highlighting one of the plurality of main menu items. Upon selecting a main menu item, the screen changes to display a sub-menu of sub-menu items associated with a selected main menu item. A first orientation of the two-dimensional navigation key is configured to select a main menu item. A second orientation of the two-dimensional navigation key is configured to select the sub-menu item of the sub-menu associated to the selected main menu item. Upon selecting the main menu item of the main menu, the sub-menu is displayed on the display. The main menu and the sub-menu can be accessed by maintaining contact with the two-dimensional navigation key. This particular embodiment is referred to as the Grid Menu Solution.

DETAILED DESCRIPTION OF THE PRESENT INVENTION

Conventional electronic devices oftentimes require at least two keystrokes to access an item in a menu. The requisite for multiple keystrokes on multiple keys often results in repetitious, erroneous entries, and further amounts to a waste of valuable time. Also, conventional electronic devices lack visual guidance as to what menus and menu items are available and accessible. Thus, such devices can be confusing and frustrating for even the most seasoned user.

The present invention of a menu-driven electronic device advantageously addresses such problems, by providing a user interface which allows for items to be accessed while maintaining contact with a single two-dimensional navigation key. The phrase "maintaining contact" means no need to move the user's thumb or finger to a different key. The present invention eliminates the need for multiple keystrokes using multiple contacts of multiple keys, as required by conventional electronic devices. Specifically, the device permits navigation of the plurality of menus with a single access of the two-dimensional navigation key. The phrase "single access" means performing the menu navigation and function selection using only the two-dimensional navigation key. The contact can be tactile or non-tactile, such as a contact of a stylus to the device. The single access can be a long press of the two-dimensional navigation key in a first orientation, or the single access can include several movements, such as the moving of a finger from the first orientation to a second orientation of the two-dimensional navigation key, wherein the contact with the two-dimensional navigation key can be maintained. Thus, this device does not require a sequence of keystrokes using a sequence of keys, like most conventional electronic devices require, but rather one continuous contact with the two-dimensional navigation key.

Also, the present invention has a more integrated, graphically-enhanced user interface, which allows for visual guidance as to what items and menus are accessible in a menu of a menu tree of the device. According to the preferred embodiment, by allowing icons to represent main menu items, the device displays which main menu item has been accessed while a menu or a sub-menu appears on the display of the device. By providing more of a visual map to the menu tree of the device, the present invention eliminates confusion and frustration commonly associated with using multi-tiered, multi-level electronic devices.

Figure 1A:
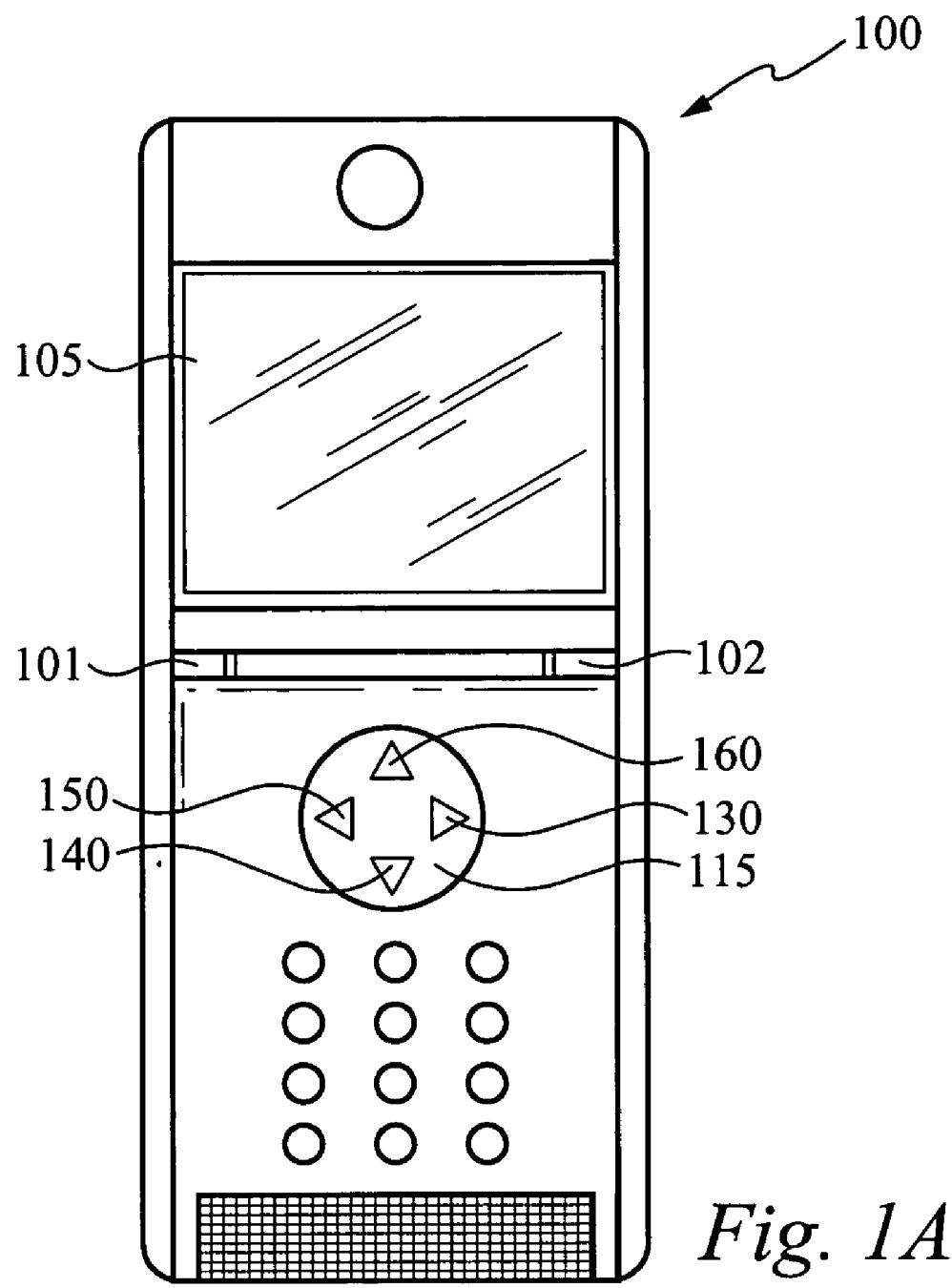
FIG. 1A is a schematic drawing of a menu-driven electronic device comprising a display and a two-dimensional navigation key.

As shown in FIG. 1A, the present invention is directed to a menu-driven electronic device 100, preferably a cellular phone, comprising a display 105 and a two-dimensional navigation key 115. The display 105 is configured to selectively display one of a plurality of menus (examples collectively shown in FIGS. 1B, 2A, 2B, 3A, 3B, and 3C), which includes a main menu 110, 110', 110" (FIGS. 1B, 2A and 3A, respectively) and a sub-menu 118, 118', 120, 120', 120" (FIGS. 1B, 2A, 2B, 3B, and 3C, respectively). A main menu is defined as a first onscreen list that includes at least two choices of operations or functions to be performed. A sub-menu is defined as an additional list of sub-menu items which are selectable only after making a main menu item selection. It will be appreciated by those skilled in the art that the device 100 in FIG. 1A can have many different levels of sub-menus stemming from the main menu 110 (FIG. 1B) of the device 100 (FIG. 1A). The device can also comprise an optional idle screen. According to the preferred embodiment of the present invention, the plurality of menus (examples collectively shown in FIGS. 1B, 2A, 2B, 3A, 3B, and 3C) are organized in a menu tree (not shown) of the device 100 (FIG. 1A).

The device 100 (FIG. 1A) is configured to allow navigation through the plurality of menus (examples collectively shown in FIGS. 1B, 2A, 2B, 3A, 3B, and 3C) by a single access of the two-dimensional navigation key 115 (FIG. 1A). The navigation can, for instance, occur while maintaining tactile contact with the two-dimensional navigation key 115. Furthermore, the device 100 is configured to allow toggling by a single access of the two-dimensional navigation key 115. The device 100 also is configured to allow scrolling among at least two control levels by a single access of the two-dimensional navigation key 115. A "control level" as used in the present invention is defined as a menu comprising of current, accessible operations.

Referring still to FIG. 1A, the two-dimensional navigation key 115 is configured to select one of a plurality of unique orientations. In the preferred embodiment of the present invention, the two-dimensional navigation key 115 has two orientations, wherein 130 and 150 are a horizontal, first orientation and 140 and 160 are a vertical, second orientation. However, it will be appreciated by one skilled in the art that the two-dimensional navigation key 115 can have any number of unique orientations, and further that the two-dimensional navigation key 115 can be configured in a variety of ways, including but not limited to the shape of a star, a circle, a square, a rectangle, and a bar. In the preferred embodiment, the device 100 of FIG. 1A further includes a plurality of optional soft keys 101 and 102.

Figure 1B:
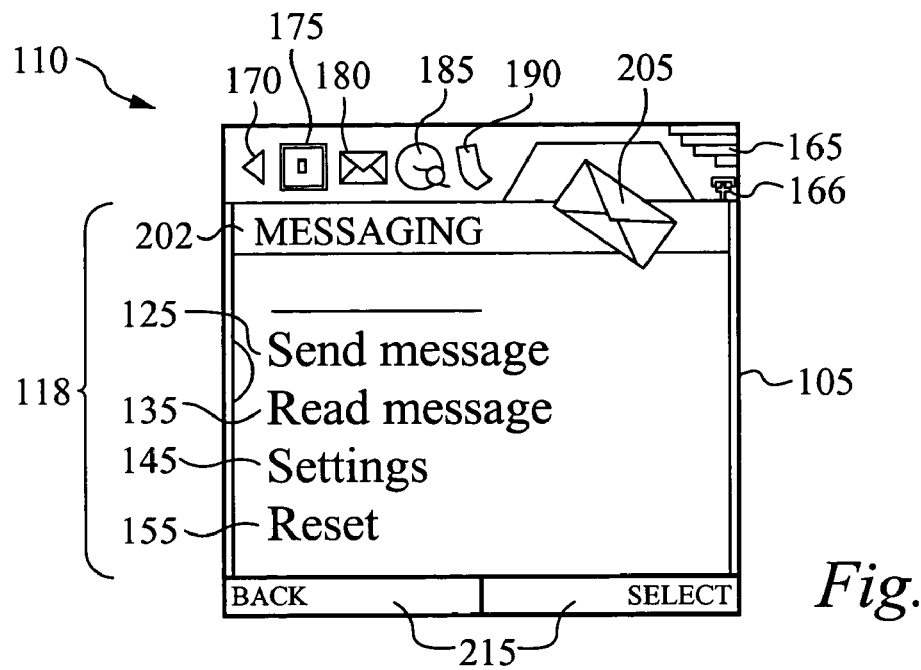
FIG. 1B is a schematic drawing of a main menu comprising a plurality of main menu items and a sub-menu associated with a selected main menu item, in accordance with the preferred embodiment of the present invention.

Turning to FIG. 1B, the preferred embodiment of the main menu 110 of the electronic device 100 (FIG. 1A) is shown. The preferred embodiment as shown in FIG. 1B is directed to the main menu 110 comprising a plurality of main menu items 170, 175, 180, 185, and 190 and a plurality of sub-menu items 125, 135, 145, and 155 of a sub-menu 118 associated with a selected main menu item. The first orientation 130 and 150 (FIG. 1A) of the two-dimensional navigation key 115 (FIG. 1A) is configured to select one of the plurality of main menu items 170, 175, 180, 185, and 190 (FIG. 1B) of the main menu 110 (FIG. 1B). According to the preferred embodiment of the present invention, at least a portion of the plurality of main menu items 170, 175, 180, 185, and 190 (FIG. 1B) is displayed on the display 105 (FIG. 1A). However, it will be appreciated by one skilled in the art that the remainder of the plurality of main menu items 170, 175, 180, 185, and 190 (FIG. 1B) can be hidden and not shown all at once on the display 105 (FIG. 1A). For instance, a tool bar (not shown) across the top of the display 105 (FIG. 1A) can be scrolled using the two-dimensional navigation key 115 to display the plurality of main menu items 170, 175, 180, 185, and 190 (FIG. 1B), plus other main menu items which are hidden.

In this case, still referring to FIGS. 1A and 1B, the first orientation 130 and 150 (FIG. 1A) of the two-dimensional navigation key 115 (FIG. 1A) is configured to select one of the plurality of main menu items 170, 175, 180, 185, and 190 (FIG. 1B). In the preferred embodiment, 130 replaces the traditional soft key of operation SELECT and 150 replaces the traditional soft key of operation BACK. Hence, in the preferred embodiment, one of the plurality of main menu items 170, 175, 180, 185, and 190 is selected using 130 (for SELECT) and a previous item or menu may be accessed by using 150 (for BACK). The selected main menu item is further represented by a main menu item icon 205 (FIG. 1B) in the menu being displayed. This highlighted main menu item icon 205 serves as a visual representation of the selected main menu item in the main menu 110 (FIG. 1B). In the preferred embodiment, when the display 105 displays the main menu 110, the main menu item icon 205 of the selected main menu item is displayed in a first appearance. When the display 105 then displays a plurality of sub-menu items 125, 135, 145, and 155 of the sub-menu 118 associated with selected main menu item, the main menu item icon 205 is displayed in a second appearance different from the first appearance. In the preferred embodiment, as shown in FIG. 1B, the main menu item icon 205 has a similar appearance to the selected main menu item (in this example, the selected main menu item is labeled 180), but the main menu item icon 205 is highlighted in some manner. It will be appreciated by those skilled in the art that the selected main menu item 180 can be highlighted in one of a variety of ways. By way of example, the first appearance as shown in the selected main menu item 180 can advantageously differ from the second appearance as shown in the main menu item icon 205 by at least one of size, shape, color, highlighting and pattern.

After selecting the selected main menu item, according to the preferred embodiment, the plurality of sub-menu items 125, 135, 145, and 155 (FIG. 1B) associated with the selected main menu item is displayed on the display 105. Thus, both the main menu item icon 205 representing the selected main menu item and the plurality of sub-menu items 125, 135, 145, and 155 are displayed on the display 105 simultaneously. According to the preferred embodiment of the present invention, the plurality of sub-menu items 125, 135, 145, and 155 (FIG. 1B) is listed in a non-graphical, textual listing. Then, a second orientation 140 and 160 (FIG. 1A) of the two-dimensional navigation key 115 is configured to select one of the plurality of sub-menu items 125, 135, 145, and 155 (FIG. 1B) associated with the selected main menu item. One of the plurality of sub-menu items 125, 135, 145, and 155 (FIG. 1B) is preferably selected with one of the second orientation 140 and 160 (FIG. 1A) of the two-dimensional navigation key 115 (FIG. 1A).

Upon selecting one of the plurality of sub-menu items 125, 135, 145, and 155 (FIG. 1B), the display 105 then displays a sub-sub-menu (not shown) associated with a selected sub-menu item. According to the preferred embodiment of the present invention, both the main menu 110 (FIG. 1B) and the sub-menu 118 can be accessed by maintaining contact with the two-dimensional navigation key 115 (FIG. 1A), eliminating the necessity of multiple keystrokes as described above. Further, when the display 105 (FIG. 1B) displays the sub-menu 118, advantageously, the main menu item icon 205, representing the selected main menu item, is also displayed.

Turning now to the specific example shown in FIG. 1B, a main menu item 180 has been selected in the main menu 110. The selected main menu item 180 is further represented by the main menu item icon 205 which mimics the shape of the envelope of the selected main menu item 180, but the main menu item icon 205 is highlighted in appearance in comparison with the selected main menu item 180. Thus, the device 100 (FIG. 1A) is configured to display the main menu item icon 205 (FIG. 1B) to provide a visual reference to an item in the menu tree of the menu being displayed. Upon selecting the selected main menu item with the first orientation 130 and 150 (FIG. 1A) of the two-dimensional navigation key 115, a title 202 (FIG. 1B) of the selected main menu item is displayed on the display 105. In the example shown in FIG. 1B, the selected main menu item, represented by the main menu item icon 205 of an envelope, has a title 202 of MESSAGING.

In the specific example shown in FIG. 1B, the selected main menu item represented by the main menu item icon 205 and having the title 202 of MESSAGING is further associated with a sub-menu 118 comprising a plurality of sub-menu items 125, 135, 145, and 155. The plurality of sub-menu items 125, 135, 145, and 155 includes accessible operations of Send message, Read message, Settings, and Reset, respectively. Thus, the device 100 (FIG. 1A) allows for one of the plurality of sub-menu items 125, 135, 145, and 155 (FIG. 1B) to be selected by the second orientation 140 and 160 (FIG. 1A) of the two-dimensional navigation key 115 (FIG. 1A). The device 100 (FIG. 1A) is further configured to display the selected main menu item represented by the main menu item icon 205 (FIG. 1B) simultaneously with the plurality of sub-menu items 125, 135, 145, and 155 associated with the selected main menu item. As stated previously, in accordance with the preferred embodiment of the present invention, one of the plurality of sub-menu items 125, 135, 145, and 155 can be selected by using one of the second orientation 140 and 160 (FIG. 1A) of the two-dimensional navigation key 115 (FIG. 1A). Upon selecting one of the plurality of sub-menu items 125, 135, 145, and 155, a sub-sub-menu (not shown) associated with a selected sub-menu item is displayed on the display 105 of the device 100 (FIG. 1A). Referring to FIG. 1B, the main menu 110 can further include a plurality of operations 215 of SELECT and BACK associated with a plurality of soft keys 101 and 102 (FIG. 1A), in accordance with one embodiment of a cellular phone. In this particular embodiment, the soft keys 101 and 102 (FIG. 1A) along with the plurality of operations 215 of SELECT and BACK are retained for the convenience of traditional cellular phone users, who are used to accessing functions using separate SELECT and BACK keys. Hence, the plurality of operations 215 and the plurality of soft keys 101 and 102 are optional, since the present invention is intended to eliminate keystrokes on separate keys outside of using the two-dimensional navigation key.

It will appreciated by those skilled in the art that FIG. 1B is for illustration purposes only, and that the layout and configuration of a main menu 110 and a sub-menu 118 can differ from that shown in FIG. 1B. Furthermore, in accordance with the preferred embodiment, the sub-menu 118 only appears after the selection of a main menu item has been completed. In the preferred embodiment, if no main menu item has been selected, then a sub-menu 118 does not appear on the display 105.

The present invention allows for navigation throughout the plurality of menus (examples collectively shown in FIGS. 1B, 2A, 2B, 3A, 3B, and 3C) of the device 100 (FIG. 1A) using the single two-dimensional navigation key 115 (FIG. 1A). Thus, the device 100 can allow for navigation using the two-dimensional navigation key 115 (FIG. 1A) or optionally, using both the two-dimensional navigation key 115 and the plurality of soft keys 101 and 102. Also, in the preferred embodiment, the main menu 110 (FIG. 1B) also conveniently includes a power supply status 165 and a signal strength status 166 of the device 100 (FIG. 1A). These are exemplary functions and need not be included.

Another embodiment of the present invention, called the Mini Icon Solution, is directed to a menu-driven wireless telecommunications device 100 (FIG. 1A) with a two-dimensional navigation key 115 and a display 105. This embodiment includes a plurality of menus, a main menu 110' (FIG. 2A), a first sub-menu 118' comprising a plurality of sub-menu items 125', 135', 145', 155', 157 (FIG. 2A), and a second sub-menu 120 (FIG. 2B). The plurality of menus can be organized in a menu tree. The optional idle screen (not shown) appears on the display 105 of the device 100 (FIG. 1A), when the device 100 has been powered on or the main menu 110' (FIG. 2A) has been exited. When the display 105 displays the optional idle screen (not shown), the main menu 110' (FIG. 2A) or a sub-menu (such as the first sub-menu 118' in FIG. 2A or the second sub-menu 120 in FIG. 2B), a plurality of operations 215' may also appear on the display 105. As discussed previously, one of the plurality of operations 215' may be selected by pressing on one of the plurality of soft keys 101 and 102 (FIG. 1A). The plurality of operations 215' (FIGS. 2A and 2B) and the plurality of soft keys 101 and 102 are optional and are intended to be a convenience tool for those who are not accustomed or do not prefer using the single two-dimensional navigation key 115 (FIG. 1A) for all navigation throughout the plurality of menus.

When the device 100 (FIG. 1A) displays the main menu 110' (FIG. 2A) of this embodiment, the main menu 110' (FIG. 2A) is similar to the main menu 110 of FIG. 1B, except that the selected main menu item is labeled 180'. Upon selection of the selected main menu item 180', the title 202' of CALL LOG (FIG. 2A) appears, instead of the title 202 of MESSAGING (FIG. 1B). Also, note that main menu 110' of FIG. 2A differs from the main menu 110 of FIG. 1B in that the first sub-menu 118' of the selected main menu item 180' comprises of five first sub-menu items (namely, 125', 135', 145', 155', and 157) in FIG. 2A, in contrast to the four sub-menu items (namely 125, 135, 145, and 155) of FIG. 1B. Also, the plurality of main menu items 170', 175', 180', 185', and 190' in the main menu 110' of FIG. 2A have different icons than those shown in the main menu 110 of FIG. 1B. The preferred embodiment is directed to the main menu 110' (FIG. 2A) comprising a plurality of main menu items 170', 175', 180', 185', and 190'. Upon selecting a main menu item, a first sub-menu 118' of a plurality of first sub-menu items 125', 135', 145', 155', and 157 simultaneously appears with the main menu items 170', 175', 180', 185', and 190' on the display 105. Referring to both FIGS. 1A and 2A, the first orientation 130 and 150 (FIG. 1A) of the two-dimensional navigation key 115 is configured to select from the plurality of main menu items 170', 175', 180', 185', and 190' (FIG. 2A) of the main menu 110'. As stated previously, in the preferred embodiment, the orientation 130 of the two-dimensional navigation key 115 is used to select one of the plurality of main menu items 170', 175', 180', 185', and 190' (FIG. 2A) of the main menu 110', while the orientation 150 of the two-dimensional navigation key (FIG. 1A) is used to return to one of a previous menu, main menu item or sub-menu item.

Figure 2A:
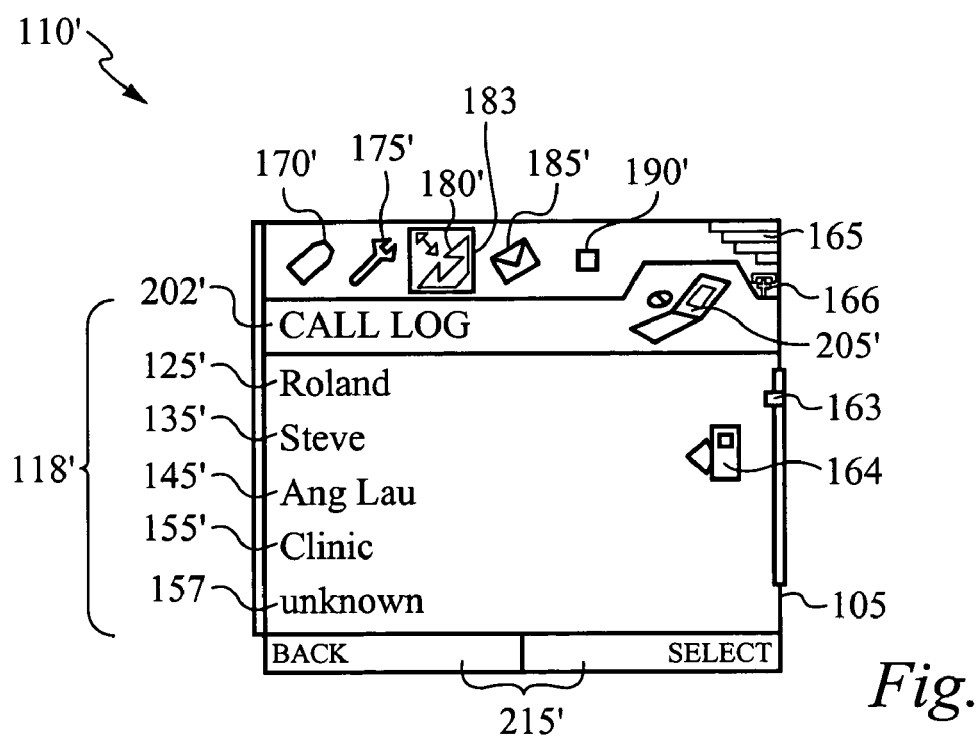
FIGS. 2A and 2B are schematic drawings of the main menu and sub-menus of the device of FIG. 1A, in accordance with the Mini Icon Solution embodiment of the present invention.
Figure 2B:
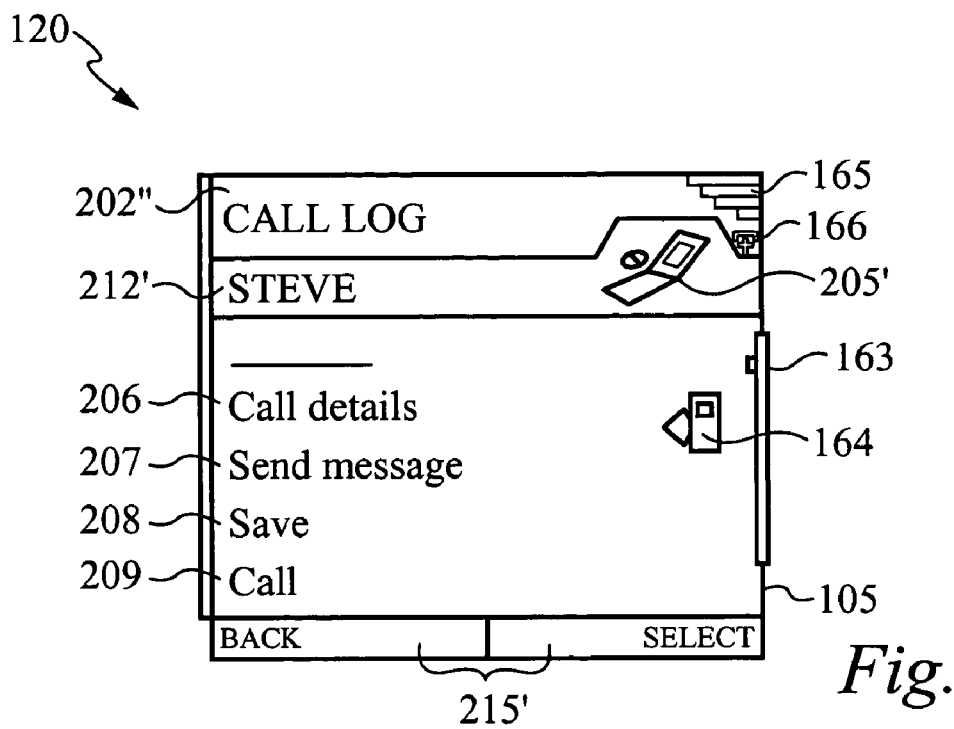

The selected main menu item in the example shown in FIG. 2A is represented by a phone and an arrow, as shown in a main menu item labeled 180'. It will be appreciated by those skilled in the art that a selected main menu item can be represented in any form or fashion, but preferably it differentiates the selected main menu item from the remainder of the plurality of main menu items. The selected main menu item is further represented by a main menu item icon 205' in the menu being displayed. It will be noted that in the example shown in FIG. 2A, the selected main menu item 180' and the main menu item icon 205' are highlighted. However, it will be appreciated by those skilled in the art that the main menu item icon 205' can be differentiated from the selected main menu item in any form or fashion. For instance, the main menu item icon 205' can be more dominant than the selected main menu item 180', the main menu item 205' can differ from the selected main menu item 180' by overall appearance (as shown in FIG. 2A), or the main menu item 205' can differ by one or more of color, shape, size, pattern, highlighting and the like.

In the example given in FIG. 2A, in accordance with the Mini Icon Solution embodiment, the device 100 (FIG. 1A) is configured to display the main menu item icon 205' (FIG. 2A) to provide a visual reference to an item in the menu tree of the menu being displayed. At least one of the plurality of main menu items 170', 175', 180', 185', and 190' of the main menu 110' is associated with a non-graphical listing of a first sub-menu 118' comprising of a plurality of first sub-menu items 125', 135', 145', 155', and 157. In this case, the selected main menu item 180' is encased by a boxed cursor 183. The selected main menu item can be selected from the plurality of main menu items 170', 175', 180', 185', and 190' using the first orientation 130 and 150 (FIG. 1A) of the two-dimensional navigation key 115 (FIG. 1A). Thus, the boxed cursor 183 encasing the selected main menu item can be moved by using the first orientation 130 and 150 (FIG. 1A) of the two-dimensional navigation key 115 (FIG. 1A). It will be appreciated by those skilled in the art that the boxed cursor 183 is just one of a myriad of ways to highlight and select a main menu item. For instance, highlighting and selection can be shown by showing a main menu item in a different color, by shadowing the main menu item in some fashion, by displaying a selected main menu item in a different font, and the like. The selected main menu item encased by the boxed cursor 183 (FIG. 2A) is further associated with the title 202' of CALL LOG, and the selected main menu item labeled 180' is also represented by the main menu item icon 205'. In the present example, the main menu item icon 205' is in the shape of an open cellular phone.

After selecting the selected main menu item labeled 180' with the first orientation 130 and 150 (FIG. 1A) of the two-dimensional navigation key 115, the first sub-menu 118' comprising of the plurality of first sub-menu items 125', 135', 145', 155', and 157 (FIG. 2A) is displayed on the display 105. In this case, the selected main menu item encased by the boxed cursor 183 is further associated the plurality of first sub-menu items 125', 135', 145', 155', 157, which correspond to Roland, Steve, Ang Lau, Clinic, and unknown, respectively. Then, the second orientation 140 and 160 (FIG. 1A) of the two-dimensional navigation key 115 (FIG. 1A) is configured to select one of the plurality of first sub-menu items 125', 135', 145', 155', and 157 (FIG. 2A) associated with a selected main menu item. In the example shown in FIG. 2A, the second orientation 140 and 160 (FIG. 1A) of the two-dimensional navigation key 115 is represented by a miniature phone cursor 164 (FIG. 2A) with the aid of a scroll bar 163. However, it will be appreciated by those skilled in the art that the miniature phone cursor 164 is exemplary. Any type of cursor can be used. Also, the main menu 110' optionally includes the plurality of operations of SELECT and BACK 215' associated with the plurality of optional soft keys 101 and 102 (FIG. 1A) of the device 100 (FIG. 1A). Thus, navigation of the plurality of menus, items, sub-menus, sub-menu items, and the like can be handled through the two-dimensional navigation key 115 (FIG. 1A) alone or in conjunction with the plurality of soft keys 101 and 102 (FIG. 1A) of the device 100 (FIG. 1A). If one of the plurality of soft keys 101 and 102 (FIG. 1A) associated with SELECT is pressed while the display 105 shows the main menu 110' (FIG. 2A), then one of the plurality of main menu items 170', 175', 180', 185', and 190' or one of the plurality of first sub-menu items 125', 135', 145', 155', and 157 (if a first sub-menu 118' appears on the display 105) may be selected. If BACK is chosen, then the display 105 can replace the main menu 110' with an optional idle screen.

In the Mini Icon Solution embodiment, in the preferred embodiment, at least one of the plurality of first sub-menu items 125', 135', 145', 155', and 157 (FIG. 2A) of the first sub-menu 118' is associated with a second sub-menu 120 (FIG. 2B). As shown in FIG. 2B, the second sub-menu 120 comprises a plurality of second sub-menu items 206, 207, 208, and 209. Upon selecting a first sub-menu item associated with the selected main menu item encased by the boxed cursor 183 (FIG. 2A) of the main menu 110', the corresponding second sub-menu 120 (FIG. 2B) is displayed on the display 105. When the display 105 displays the main menu 110' (FIG. 2A), a first orientation 130 and 150 (FIG. 1A) of the two-dimensional navigation key 115 is configured to select the selected main menu item encased by the boxed cursor 183 (FIG. 2A) from the plurality of main menu items 170', 175', 180', 185', and 190', while a second orientation 140 and 160 (FIG. 1A) of the two-dimensional navigation key 115 is configured to select one of the plurality of first sub-menu items 125', 135', 145', 155', and 157 (FIG. 2A) of the selected main menu item. When the display 105 displays the second sub-menu 120 (FIG. 2B), a third orientation (not shown) of the two-dimensional navigation key 115 (FIG. 1A) is configured to select one of the plurality of second sub-menu items 206-209 (FIG. 2B) of the second sub-menu 120. The third orientation of the two-dimensional navigation key 115 (FIG. 1A) can be the same as or parallel to the first orientation 130 and 150.

Thus, in the current example shown in FIGS. 2A and 2B, upon selecting a first sub-menu item 135' (FIG. 2A) called STEVE, the display 105 then displays the second sub-menu 120 (FIG. 2B) associated with the selected main menu item 135' (FIG. 2A). As shown in FIG. 2B, when the display 105 displays the second sub-menu 120, the display 105 simultaneously shows a first title 202" of the selected main menu item of CALL LOG and a second title 212' of the selected second sub-menu item of STEVE. This visual reminder of multiple titles of main menu items and sub-menu items concurrently accessed assist in providing a reference point in the menu tree of the item of the menu being displayed. In the present example, the display 105 of FIG. 2B shows that a main menu item having the title 202" of CALL LOG and a first sub-menu item on having the title 212' STEVE were selected. As described previously, both the main menu 110' (FIG. 2A), the first sub-menu 118' (FIG. 2A), and the second sub-menu 120 (FIG. 2B) can be accessed by maintaining contact with the two-dimensional navigation key 115 (FIG. 1A), eliminating the necessity of multiple keystrokes.

Further, when the display 105 displays the second sub-menu 120 (FIG. 2B), a plurality of second sub-menu items 206, 207, 208, and 209 (FIG. 2B) appears on the display 105 in textual form. In the example shown in FIG. 2B, the plurality of second sub-menu items 206, 207, 208, and 209 associated with the second sub-menu item having the second title 212' STEVE includes Call details, Send message, Save, and Call, respectively. The second sub-menu 120 further includes the same main menu item icon 205' of FIG. 2A. The second sub-menu 120 optionally can include the power supply status 165, the signal strength status 166, and the plurality of operations of SELECT and BACK 215' associated with the plurality of soft keys 101 and 102 (FIG. 1A) of the device 100. In the second sub-menu 120 (FIG. 2B), one of the plurality of operations 215' associated with SELECT can be chosen by pressing one of the plurality of soft keys 101 and 102 (FIG. 1A). When SELECT is chosen, then in the second sub-menu 120 one of the plurality of second sub-menu items 206-209 presently highlighted by the miniature phone icon 164 is selected. When BACK is chosen, the second sub-menu 120 (FIG. 2B) is replaced by the main menu 110' (FIG. 2A) on the display 105. A third orientation (not shown) of the two-dimensional navigation key 115 (FIG. 1A) is configured to select one of the plurality of second sub-menu items 206-209 (FIG. 2B). The third orientation can be the same as or parallel to the first orientation 130 and 150 (FIG. 1A) or the second orientation 140 and 160 (FIG. 1A), when selecting from the second orientation 140 and 160 or at some other angle. In the second sub-menu 120 (FIG. 2B), the third orientation can be visually depicted through the assistance of the miniature phone icon 164 and the scroll bar 163.

Figure 3A:
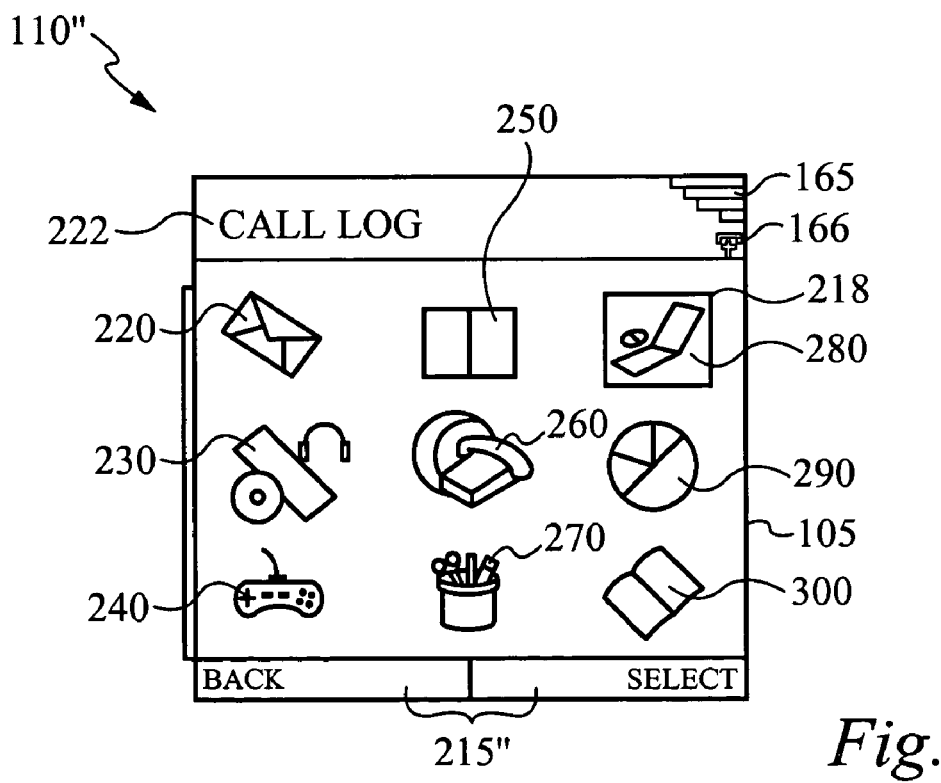
FIGS. 3A, 3B, and 3C are schematic drawings of a main menu and several sub-menus, of the device of FIG. 1A, in accordance with the Grid Menu Solution embodiment of the present invention.
Figure 3B:
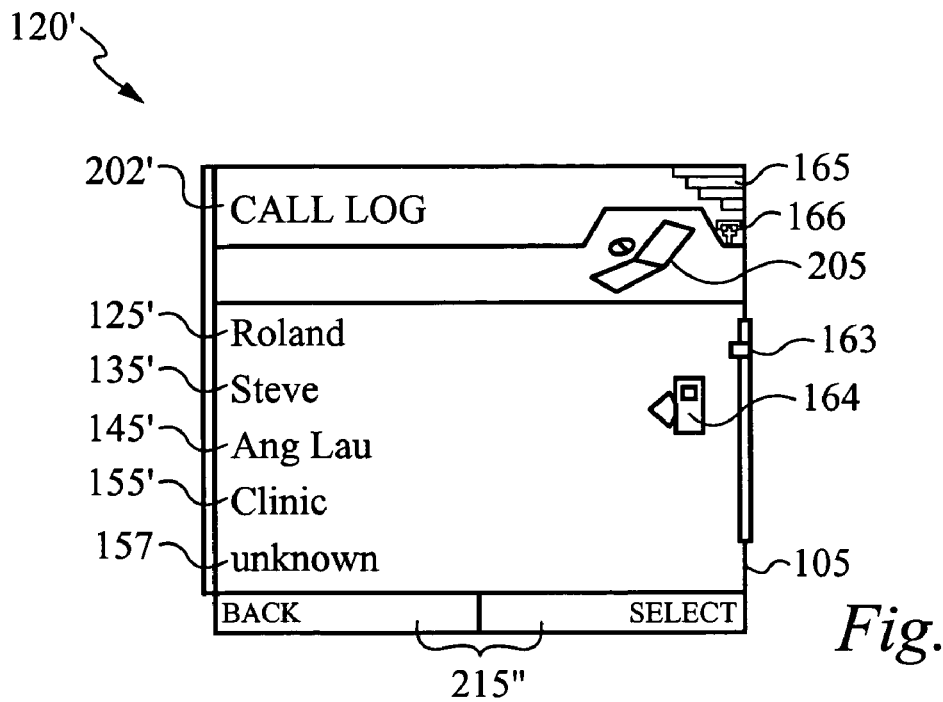
Figure 3C:
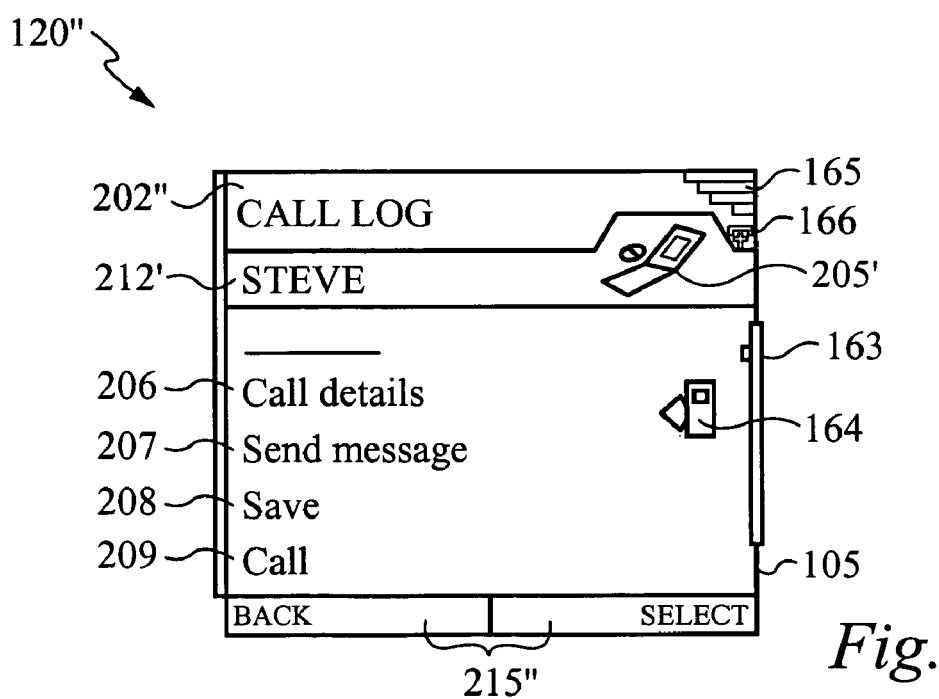

Turning now to the example shown in FIGS. 3A, 3B, and 3C, a further embodiment of the present invention is the so-called Grid Menu Solution, which includes a main menu and several sub-menus. The idle screen (not shown) of this embodiment can be optional, like the optional idle screen of the Mini Icon Solution embodiment. The first sub-menu 120' of this embodiment shown in FIG. 3B is similar to the main menu 110' (FIG. 2A) of the Mini Icon Solution embodiment, except it lacks the plurality of main menu icons 170, 175', 180', 185', and 190' of FIG. 2A. The second sub-menu 120" of this embodiment shown in FIG. 3C is similar to the second sub-menu 120 (FIG. 2B) of the Mini Icon Solution embodiment.

The difference between the Grid Menu Solution and the Mini Icon Solution lies in the addition of a level which comprises a main menu 110" (FIG. 3A) of the Grid Menu Solution. The main menu 110" comprises a plurality of main menu item icons 220, 230, 240, 250, 260, 270, 280, 290, and 300 and a title 222 of a selected main menu icon. In the example shown in FIG. 3A, the selected main menu icon labeled 280 is an icon shaped to represent an open cellular phone. The selection is shown by a cursor 218 in the shape of a box, although it will be appreciated by those skilled in the art that the selection of the selected main menu item icon can be indicated by any shape, highlighting, coloring, or pattern different from the remainder of the plurality of main menu icons 220, 230, 240, 250, 260, 270, 280, 290, and 300. The main menu 110" preferably includes the plurality of operations 215" associated with the plurality of soft keys 101 and 102 (FIG. 1A) of the device 100. The plurality of operations 215" and the plurality of soft keys 101 and 102 (FIG. 1A) are optional, as discussed previously. In this case, the plurality of operations 215" comprises of SELECT and BACK, which is similar to the ones mentioned in the previous embodiment. Thus, if SELECT is chosen, then the main menu icon presently boxed by the cursor 218 will be selected. If BACK is chosen, then the display 105 will replace the main menu 110" with an optional idle screen (not shown). Also, the main menu 110" preferably includes the power supply status 165 and the signal strength status 166.

In the example shown in FIG. 3A, the selected main menu icon encased by the cursor 218 has a title 222 of CALL LOG. Once the first orientation 130 and 150 (FIG. 1A) of the two-dimensional navigation key 115 is used to select the selected main menu icon, the first sub-menu 120' (FIG. 3B) is displayed on the display 105. Similar to the previous embodiment of Mini Icon Solution described above, a second orientation 140 and 160 (FIG. 1A) of the two-dimensional navigation key 115 selects a first sub-menu item out of a plurality of first sub-menu items 125', 135', 145', 155', and 157 (FIG. 3B) of the first sub-menu 120'. The first sub-menu 120' optionally has the plurality of operations 215" SELECT and BACK. If SELECT is chosen, one of the plurality of first sub-menu items 125', 135', 145', 155', and 157 can be selected with the help of the miniature phone icon 164 and the scroll bar 163, similar to the ones described in the Mini Icon Solution embodiment. If BACK is selected, then the first sub-menu 120' is replaced with the main menu 110" (FIG. 3A) on the display 105.

Upon selecting the selected first sub-menu item, a second sub-menu 120" (FIG. 3C) replaces the first sub-menu 120' (FIG. 3B), and is displayed on the display 105. In the second sub-menu 120" (FIG. 3C), the title 202" of the selected main menu item icon (CALL LOG) and the title 212' of the selected first sub-menu item (STEVE) are displayed on the display 105. A third orientation (not shown) of the two-dimensional navigation key 115 (FIG. 1A) can select one of a plurality of second sub-menu items 206-209 (FIG. 3C) of the second sub-menu 120". The miniature phone icon 164 and the scroll bar 163 can assist in selecting one of the plurality of second sub-menu items 206-209. The second sub-menu 120" also has the optional plurality of operations 215" of SELECT and BACK. Thus, the two-dimensional navigation key 115 (FIG. 1A) alone or in conjunction with one of the plurality of soft keys 101 and 102 (FIG. 1A) associated with SELECT can be used to select one of the plurality of second sub-menu items 206-209 (FIG. 3C) of the second sub-menu 120". If BACK is chosen while the display 105 displays the second sub-menu 120", then the display 105 will cease to display the second sub-menu 120" and instead will display the first sub-menu 120' (FIG. 3B). It will also be appreciated by those skilled in the art that 130 (FIG. 1A) can be used as SELECT, and 140 and 160 (FIG. 1A) can be used to scroll through sub-menu items.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A menu-driven electronic device comprising:
   a. a display configured to selectively display at least one of a plurality of menus, including a main menu and a sub-menu; and
   b. a two-dimensional navigation key configured as a single-button including four sets of contact points, wherein during a menu selection mode, a plurality of main menu items of the main menu remains visible after a main menu item is selected, while the two-dimensional navigation key is configured to select and perform an action corresponding to one of the plurality of main menu items of the main menu and to select and perform an action corresponding to a sub-menu item of the sub-menu associated with a selected main menu item using the four sets of contact points.

2. The device according to claim 1, wherein at least a portion of the plurality of main menu items is displayed, and further wherein both the main menu and the sub-menu can be accessed by maintaining contact with the two-dimensional key.

3. The device according to claim 1, wherein the device is configured to allow navigation through the plurality of menus by using the two-dimensional navigation key.

4. The device according to claim 1, wherein the device is configured to allow navigation through the plurality of menus while maintaining tactile contact with the two-dimensional navigation key.

5. The device according to claim 1, wherein the device is configured to allow toggling among at least two control levels by a single access of the two-dimensional navigation key.

6. The device according to claim 1, wherein the device is configured to allow toggling between the main menu and one of the plurality of main menu items by using a first direction of the two-dimensional navigation key and to allow toggling between the selected main menu item and the sub-menu associated with the selected main menu item by using a second direction of the two-dimensional navigation key.

7. The device according to claim 1, wherein the device is configured to allow scrolling among at least two control levels by a single access of the two-dimensional navigation key.

8. The device according to claim 1, wherein the device is configured to display the selected main menu item simultaneously with the sub-menu associated with the selected main menu item.

9. The device according to claim 1, wherein the device is configured to display the selected main menu item simultaneously with a plurality of sub-menu items associated with the selected main menu item.

10. The device according to claim 1, wherein the plurality of menus are organized in a menu tree.

11. The device according to claim 1, wherein the main menu further comprises a main menu item icon representing a main menu item.

12. The device according to claim 11, wherein the device is configured to display the main menu item icon to provide a visual reference to an item in the menu tree of the menu being displayed.

13. The device according to claim 12, wherein when the device displays at least a portion of the main menu, the main menu item icon is displayed in a first appearance, and when the device displays the sub-menu, the main menu item icon is displayed in a second appearance different from the first appearance.

14. The device according to claim 13, wherein the first appearance differs from the second appearance by at least one of size, shape, color, highlighting, and pattern.

15. The device according to claim 14, wherein when the device displays the sub-menu, the main menu item icon is displayed in a third size different from the first size and the second size.

16. The device according to claim 9, wherein the main menu further comprises a non-graphical listing of the plurality of sub-menu items of the sub-menu associated with the selected main menu item.

17. The device according to claim 1, wherein the device is a phone.

18. A menu-driven wireless telecommunications device comprising:
  a. a display configured to selectively display at least one of a plurality of menus, including a main menu, a first sub-menu, and a second sub-menu; and
  b. a two-dimensional navigation key configured as a single-button including four sets of contact points, wherein during a menu selection mode, a plurality of main menu items of the main menu remains visible after a main menu item is selected, while the two-dimensional navigation key is configured to select and perform an action corresponding to one of the plurality of main menu items of the main menu, to select and perform an action corresponding to a first sub-menu item of the first sub-menu associated with a selected main menu item, and further to select and perform an action corresponding to a second sub-menu item of the second sub-menu associated with the selected main menu item using the four sets of contact points.

19. The device according to claim 18, wherein the device is configured to allow scrolling between the main menu and one of the plurality of main menu items by using a first direction of the two-dimensional navigation key, to allow scrolling between the selected main menu item and the first sub-menu associated with the selected main menu item by using a second direction of the two-dimensional navigation key, and further to allow scrolling between the second sub-menu associated with the selected main menu item and a second sub-menu item by using a third direction of the two-dimensional navigation key.

20. The device according to claim 19, wherein the third direction corresponds with the first direction of the two-dimensional navigation key.

21. The device according to claim 18, wherein the device is configured to display a main menu item icon to provide a visual reference to an item in a menu tree of the menu being displayed.

22. A menu-driven wireless telecommunications device comprising:
  a. a display configured to selectively display at least one of a plurality of menu trees, including a plurality of main menu items, each having a plurality of sub-menu items; and
  b. a two-dimensional navigation key configured as a single-button configured to operate along two orthogonal paths such that each of the orthogonal paths has two directions along the path, wherein during a menu selection mode, the plurality of main menu items remains visible after a main menu item is selected, while:
    i. operating the key along a first of the orthogonal paths selects a preferred main menu item from among the plurality of main menu items;
    ii. operating the key along a second of the orthogonal paths selects a preferred sub-menu item among the plurality of sub-menu items; and
    iii. operating the key along the first orthogonal path activates the selected sub-menu item.

23. The device according to claim 22, wherein when the menu trees have multiple sub-menu levels such that each next level is traversed by changing between the first orthogonal path and the second orthogonal path unto a lowest level is achieved wherein a selected lowest level sub-menu is activated by changing between the first orthogonal path and the second orthogonal path.

24. The device according to claim 22, wherein the plurality of menu items includes a first sub-menu and a second sub-menu, wherein the first sub-menu further comprises a plurality of first sub-menu items and further wherein one of the plurality of first sub-menu items is associated to a second sub-menu.

25. The device according to claim 24, wherein the second sub-menu further comprises a plurality of second sub-menu items.

26. The device according to claim 25, wherein a third orientation of the two-dimensional navigation key is configured to select one of the plurality of second sub-menu items.

27. A menu-driven electronic device comprising:
  a. a display configured to selectively display at least one of a plurality of menus; and
  b. a two-dimensional navigation key configured as a single-button including four sets of contact points, wherein during a menu selection mode, a plurality of main menu items of a main menu remains visible after a main menu item is selected, while the two-dimensional navigation key is configured to directly toggle between a sub-menu associated with a first main menu item and a sub-menu associated with a second main menu item by a single access of the two-dimensional navigation key.

28. The device according to claim 27, wherein the two-dimensional navigation key is configured to allow scrolling.

29. The device according to claim 27, wherein the plurality of menus include:
   a. a main menu having a plurality of main menu items; and
   b. sub-menus, each sub-menu associated with a main menu item and has at least one submenu item.

30. The device according to claim 29, wherein the two-dimensional navigation key includes a vertical orientation and a horizontal orientation.

31. The device according to claim 30, wherein the vertical orientation is configured to select one of the plurality of main menu items.

32. The device according to claim 31, wherein the display is configured to display at least one sub-menu item of the sub-menu associated with a selected main menu item.

33. The device according to claim 32, wherein the horizontal orientation is configured to select one of the at least one sub-menu item associated with the selected main menu item.

34. The device according to claim 32, wherein the selected main menu item is further represented by a icon in the main menu, the icon having a different appearance than the selected main menu item in the main menu.

35. The device according to claim 29, wherein the main menu and a sub-menu are accessed by maintaining contact with the two-dimensional navigation key.

\* \* \* \* \*